(12) United States Patent
Gasser

(10) Patent No.: US 12,715,701 B2
(45) Date of Patent: Aug. 25, 2026

(54) CONTAINER SUPPLY SYSTEM FOR THE TRANSPORT OF A CONTAINER

(71) Applicant: FERRUM PACKAGING AG, Schafisheim (CH)

(72) Inventor: Cyrill Gasser, Lenzburg (CH)

(73) Assignee: FERRUM PACKAGING AG, Schafisheim (CH)

( * ) Notice: Subject to any disclaimer, the term of this patent is extended or adjusted under 35 U.S.C. 154(b) by 0 days.

(21) Appl. No.: 18/219,058

(22) Filed: Jul. 6, 2023

(65) Prior Publication Data

US 2024/0025654 A1 Jan. 25, 2024

(30) Foreign Application Priority Data

Jul. 19, 2022 (EP) .................................... 22185615

(51) Int. Cl.
*B65B 35/24* (2006.01)
*B65B 43/52* (2006.01)
*B65G 17/38* (2006.01)

(52) U.S. Cl.
CPC .............. *B65G 17/38* (2013.01); *B65B 43/52* (2013.01); *B65G 2201/0235* (2013.01); *B65G 2203/0233* (2013.01); *B65G 2203/042* (2013.01)

(58) Field of Classification Search
CPC ......... B65B 43/52; B65B 35/00; B65B 35/24; B65B 35/243; B65B 35/30; B65B 35/44; B65B 57/00; B65B 35/10
USPC ................................ 198/339.1, 340, 341.01
See application file for complete search history.

(56) References Cited

U.S. PATENT DOCUMENTS

| | | | | |
|---|---|---|---|---|
| 3,643,753 A * | 2/1972 | Godwin | G01G 15/00 | 177/210 R |
| 3,742,477 A * | 6/1973 | Enabnit | B65G 43/02 | 340/676 |
| 4,776,146 A * | 10/1988 | Whitehouse | B65B 5/101 | 53/500 |
| 5,310,041 A | 5/1994 | Draghetti | | |
| 5,906,265 A | 5/1999 | Spatafora | | |
| 6,094,893 A * | 8/2000 | Draghetti | B29C 66/81457 | 53/375.9 |

(Continued)

FOREIGN PATENT DOCUMENTS

| | | |
|---|---|---|
| KR | 102090662 B1 | 3/2020 |
| WO | 2014207582 A2 | 12/2014 |
| WO | 2020004917 A1 | 1/2020 |

OTHER PUBLICATIONS

European Search Report issued Dec. 22, 2022 in corresponding European Application No. 22185615.6.

*Primary Examiner* — Gloria R Weeks
(74) *Attorney, Agent, or Firm* — Spencer Fane, LLP

(57) ABSTRACT

A container supply system for the transport of a container along a transport route from a container source to a container receiver includes a movement device configured to receive and transport the container along the transport route, a transport belt stretching along the transport route with a length, the container moveable upon the transport belt along the transport route by the movement device, and a sensor arranged at the transport belt to detect the container. The sensor stretches along a width of the transport belt running perpendicular to the length of the transport belt such that the container moving along the transport route is detectable by the sensor.

13 Claims, 5 Drawing Sheets

(56) References Cited

U.S. PATENT DOCUMENTS 7,089,711 B2 * 8/2006 Timmerman ............ B65H 1/20
53/550
7,269,933 B2 * 9/2007 Le ............................ B65B 7/20
53/64
9,146,146 B2 * 9/2015 Laird ..................... G01G 19/00
10,191,001 B2 * 1/2019 Kleczewski ............ G01L 1/144
10,543,942 B2 * 1/2020 Almogy .................... B07C 5/34
2004/0155033 A1 * 8/2004 Spatafora ............... G01K 13/06
374/E13.009
2005/0183402 A1 * 8/2005 Ball ........................ B65B 43/52
53/391
2005/0262802 A1 * 12/2005 Natterer .................. B65B 43/52
198/418
2006/0180440 A1 * 8/2006 Lewis ..................... G09F 19/22
198/810.03
2009/0250384 A1 * 10/2009 Valerio ................... B07C 5/344
209/571
2012/0118704 A1 * 5/2012 Atcher .................... B65B 5/101
198/572
2014/0087633 A1 3/2014 Read et al.
2016/0103084 A1 4/2016 Kleczewski
2016/0252387 A1 * 9/2016 Laird .................. G01G 19/035
177/1
2019/0047023 A1 * 2/2019 Benedetti ................ B07C 5/342
2020/0101497 A1 * 4/2020 Hawkins ................. B07C 5/344

* cited by examiner

CONTAINER SUPPLY SYSTEM FOR THE TRANSPORT OF A CONTAINER

CROSS-REFERENCE TO RELATED APPLICATION

This application claims priority to European Patent Application No. 22185615.6, filed Jul. 19, 2022, the contents of which are hereby incorporated by reference in its entirety.

BACKGROUND

Technical Field

The disclosure concerns a container supply system for the transport of a container, a processing device for processing a container and a sealer for sealing a container. The disclosure further concerns a method for sealing a container and a method for the transport of a container with a container supply system according to the disclosure.

Background Information

During the filling of beverage cans or food cans, after the filling with the beverage or the food, the cans pass through a can sealer, wherein the filled can bodies enter via a supply line and can lids enter via another supply line. The can sealer usually includes several equal stations arranged in a carousel-shape, in each of which a can is sealed with a can lid. The can lids are guided onto the can bodies and kept on the can body with a holding plate of a seaming head. This holding also serves the fixation of the cans against a breaking out of the circular pathway traversed by the cans in the can sealer due to the centrifugal force. In the can sealer, the can bodies with the can lid are seamed over a seaming roll at the edges and thereby sealed. As a rule, the can with the can lid is additionally rotated around its own axis of symmetry by the seaming head. For the rotation the seaming rolls and seaming heads are arranged on a respective seaming shaft.

A generic can sealer is described in DE749636 and DE4234115A1. The can sealer includes a clamping device for the reception of the can to be sealed. In operating mode, the can to be sealed is brought into the clamping device and secured by the clamping device in the axial and radial directions. A can lid is equally brought in centrally above the can opening of the can to be sealed. In the area of the can opening the can includes a circumferential can flange and the can lid a circumferential can lid flange. For sealing the can opening by the can lid, the can sealer additionally includes two seaming rolls mounted rotatable around one axis respectively, which press the can flange and the can lid flange together by an essentially radially acting force, wherein the pressing is performed by a continuous scrolling in circumferential direction along the circumference of the can opening.

An additional can sealer is known from GB2093399 A. The can sealer includes a clamping device for the reception of the can to be sealed and a seaming roll. In operating mode, the can to be sealed is brought into the clamping device and secured by the clamping device in the axial and radial directions. Equally a can lid is brought in centrally above the can opening of the can to be sealed. The can includes a circumferential can flange in the area of the can opening of the can body and the can lid includes a circumferential can lid flange.

Before the actual seaming process, the lid and the can are united at a defined point (the X-point). The supplying of the lids happens rotationally on top of a gassing-rotor, on which the lids lie. The cans are guided linearly to the X-point via a can supplier. In order for a lid for the can to be triggered in due time, a detection system is required, which detects the cans on the can supplier.

For a better understanding of the subject matter of the present disclosure a container supply system from the state of the art will be described in the following, using FIG. 1.

Within the framework of the disclosure, for a better differentiation of the known state of the art from the present disclosure, reference signs referring to features of known devices will be marked with an apostrophe (in FIG. 1), while features referring to devices or their parts according to the disclosure will not have an apostrophe.

FIG. 1 depicts a known container supply system 1' for the transport of a container 100' along a transport route 5' from a container source to a container receiver.

The container supply system 1' includes a movement device (not depicted) for the reception and the transport of the container 100' along the transport route S' in direction A'. In the area of the can sealer, the movement device is usually a carrier attached to a chain.

The container supply system 1' also includes a transport belt 6' stretching along the transport route S', upon which transport belt 6' the container 100' is moved in a gliding manner along the transport route S' by the carriers.

For the detection of the container 100', the container supply system 1' includes a sensor 4', arranged on the side next to the transport belt 6', which is designed as an inductive sensor and attached on the side.

The sensor 4' detects the container 100' moving past in direction A' and outputs a control signal, which ensures that a lid for the container 100' is triggered.

SUMMARY

The containers 100' however run centrally on the transport belt 6'. It has been determined that this has the effect that, in the case of a change of the container format (different diameter) the sensor 4' must be moved closer or further away in each case.

It is thus the objective of the disclosure, to provide a container supply system, which avoids the adverse effects known from the state of the art. Specifically, a container supply system should be provided which has a simple design and does not have to be adjusted during a change in format.

The objective is achieved by a container supply system according to the disclosure, a processing device according to the disclosure, a sealer according to the disclosure and the methods according to the disclosure.

According to the disclosure, a container supply system for the transport of a container along a transport route from a container source to a container receiver is suggested.

The container supply system includes a movement device for the reception and transport of the container along the transport route and a transport belt stretching along the transport route with its length, upon which transport belt the container is moveable along the transport route by the movement device (the length thus especially stretches along a movement direction of the container in operating mode). For the detection of the container, the container supply system also includes a sensor arranged at the transport belt.

Herein, the sensor stretches along (especially above) a width of the transport belt running perpendicular to the length of the transport belt in such a way that the container moving along the transport route (in an operating mode) is detectable by the sensor.

Since the sensor is thus not arranged on the side next to the transport belt, but rather stretches over the width of the transport belt, the sensor does not need to change its position during a change in format to a different container diameter, since a distance to the container moving past is the same for every container diameter.

The sensor can be arranged in, below or above the transport belt. In here means that the sensor is integrated into a material of the transport belt or is arranged in an inner area of the transport belt.

Preferably, however, the sensor is arranged in or below the transport belt. In this way, the distance to a container moving past also remains the same if there is a change in format to another height and a change in the position of the sensor can be avoided.

The sensor can especially be arranged centrally in relation to the width of, meaning in the center of, the transport belt.

In practice, the sensor can be part of a detection system, or be connected to a control device, so that a signal, which is produced by the container moving past the sensor, can be converted into a control signal, which controls the lid supply and enables a providing of the lid.

Especially preferably, the sensor is an inductive sensor, which detects the container by measuring a change in the inductance caused by the container moving past.

For this purpose, the container preferably includes a coil, which creates a magnetic field. The magnetic field is changed by the container moving past. A contact-less container detection is made possible by this principle of measurement.

Alternatively, an optical sensor could also be used, which is arranged above the transport belt or at an optically transparent section of the transport belt. Alternatively, the transport belt could be optically transparent so that a container detection through the transport belt (meaning from below the transport belt) is made possible.

Additionally, amongst other things, another radiation-based sensor can be used, and a multitude of (different) sensors can be used. A multitude of sensors enables a control of the container detection.

Generally, the transport belt can be a conveyor belt, so that the container is movable along the transport route by a movement of the conveyor belt. A conveyor belt can thus simultaneously also function as a movement device, an additional movement device could however also still be used.

Preferably, however, the transport belt is a gliding belt, which is specifically immobile, meaning stationary, so that the container is moveable in a gliding manner over a gliding surface of the gliding belt along the transport route. In a gliding belt a separate movement device is needed which guides the container across the gliding belt.

Thus, the container moves in a gliding manner across a surface of the gliding belt. "In a sliding manner" specifically means, that the container, preferably at a constant speed, slides along the surface of the gliding belt. Herein a contact occurs between a surface of the container and the surface of the gliding belt.

Especially preferably, the movement device includes a carrier for the reception and the transport of the container as well as a pulling element, which is connected to the carrier in such a way, that the carrier is movable along the transport route by a movement of the pulling element.

The container supply system can also include a drive, which is coupled to the pulling element in such a way that the pulling element is moveable by the drive (whereby the carriers are also moved).

The drive can be an arbitrary energy source from the state of the art, which is suitable to drive the pulling element. The drive can for example be a motor, especially a servo motor. The pulling element can specifically be arranged at the drive in such a way, that the pulling element can be moved by the drive. The carrier is also put in motion by the movement of the pulling element. If the pulling element is a revolving pulling element, such as a revolving flat cogged belt, the container supply system preferably includes the motor and a second motor or a pulley. The revolving pulling element is then put in motion by the motor and runs across the pulley.

Especially preferably, however the movement device includes a multitude of (especially finger shaped) carriers, wherein the carriers are connected to the pulling element, especially are attached directly to the pulling element. The pulling element can be a chain, a belt, a rope, or a strap. The carriers can especially be spread across the pulling element evenly, so that a multitude of containers can be transported effectively. In all embodiments of the disclosure one (single) pulling element preferably includes a multitude of carriers to enable a simultaneous transport of a multitude of containers.

In addition, embodiments are imaginable, in which container guiding devices are arranged at the transport belt. These can e.g., be simple transport tracks, which are attached parallel to the pulling element at the distance of the width of the transport belt, and which stretch along the transport route from the container source to the container receiver. By these container guiding devices, it is avoided that containers veer off the transport route during operation. This could for example happen in turns or during sharp changes of direction of the transport belt. Especially preferably, however, the carriers according to the disclosure are designed in such a way, especially curved in such a way, that the containers are kept in position by the carrier and thus no respective container guiding systems are required.

According to the disclosure a processing device for processing a container is additionally suggested including a container source, a container receiver as well as a container supply system according to the disclosure, which is arranged between the container source and the container receiver for the transport of the container from the container source to the container receiver.

The container source can be a container dispenser for providing empty containers and/or the container receiver can be designed in the form of a filling station for filling the container with a filling material.

Alternatively, or additionally, the container source can be designed in the form of a filling station for filling the container with a filling material and/or wherein the container receiver is designed in the form of a sealer for sealing the container by a lid.

Additionally, a sealer with a container supply system according to the disclosure for supplying a container to a working space of the sealer is suggested. The sealer can also include a carousel shaped station with a multitude of sealing devices, wherein the container supply system transports the containers, specifically the containers filled with a product, to the station, and an outlet from the station for sealed (with the lid) containers.

Preferably, the sealer also includes a de-stacking for the lids, which is triggered by the sensor and thus provides the lids. After a de-stacking process during which the lids are separated from a stack individually by the de-stacking, a supplying device, such as a lid rotor brings the lid to the container.

According to the disclosure, a method for the transport of a container is additionally suggested. In the method, the container supply system according to the disclosure is provided and the container is transported along the transport route by the container supply system.

In practice, the transporting of the container can include that the container is received from the container source by the movement device in a reception area and that the container is transported along the transport route by the movement device, wherein a container moving along the transport route is detected by the sensor.

Herein the container can be detected by the sensor, wherein the sensor triggers the control signal via the connected detection system, which causes the providing of the lid.

According to the disclosure, a method for sealing a container is additionally suggested, which includes the providing of the sealer according to the disclosure and the supplying of the container to the working space by the container supply system. Additionally, the container is detected by the sensor in the method, whereby a lid is provided. Subsequently, the sealing of the container with a lid occurs in the working space.

Therein the lid is preferably transported to the container by the supplying device (e.g., in the form of the lid rotor with stationary tracks). Afterward the lid is placed on an opening of the container and the container is sealed with the lid.

The sealing of the container can include the positioning of the container on a lifting station, the seaming of the lid to the container by at least one seaming roll, especially with two seaming rolls and the seaming head. Finally, the sealed container can be discharged from the working pace of the sealer.

The working space is that space of the sealer in which the container is preferably sealed with the lid, especially that space in which a seaming process occurs. The working space is preferably enclosed by a casing and thus isolates the working space of the sealer (and thus enables the formation of a hygiene zone).

The casing can especially be seen as a cladding, coating, encasing, or sheathing, which surrounds the working space at least partially. Therein the casing can close off and/or shield the working space from the outside, so that an atmosphere in the working space is hygienically separated from the surroundings.

The sealing device can be a sealing head for sealing the container with the lid. The sealing head can include seaming mediums for seaming the lid to the container. The seaming mediums can be a seaming roll and a seaming head. The or each sealing head can thus include at least one seaming roll (especially preferably two seaming rolls) and a seaming head. Herein the sealing head can include seaming shafts which are rotatable around a seaming axis, wherein the seaming medium is arranged on one end of the respective seaming shaft (seaming head and seaming roll are thus especially rotatable via respective seaming shafts).

The sealer according to the disclosure can further include the lifting station or a multitude of lifting stations) for lifting the container. The lifting stations can be arranged opposite the sealing heads.

In practice, the sealer can include a container discharge for discharging the containers from the working space. A separating wall or blind can be arranged between the container supply system and the container discharge, which prevents a cross-contamination between the incoming and outgoing containers.

Additionally, the container supply system can be designed as an insertion table known from the state of the art, wherein the sensor is arranged according to the disclosure, in order to avoid the disadvantages of the state of the art.

The sealer according to the disclosure is preferably designed as a can sealer. The can sealer usually includes the several, carousel like arranged, equal stations (preferably of sealing heads and lifting stations), in which a can is sealed with a lid in each case.

The container can be a can and the lid can be a can lid, which are seamed together by the can sealer.

For sealing the can, the can sealer preferably includes several sealing heads (as previously described with several seaming rolls and one seaming head). In operational mode, the seaming rolls are brought into contact with a can lid flange of the can lid and a can flange of the can with their respective seaming profile, By rotation of the can, the seaming roll is then rotated in circumferential direction of the can, whereby the can flange is seamed with the can lid flange. For the rotation of the can, the can is preferably clamped between the seaming head and a support (especially the lifting station), wherein the seaming head is rotated around the seaming axis by the seaming shaft.

In practice, the can sealer preferably includes a clamping device made up of seaming head and lifting station as known from the state of the art, with which the can is fixed in axial and radial direction for sealing and can be rotated in circumferential direction.

Within the framework of the disclosure, the can can be understood as a rotation-symmetrical container, which is sealed by the can sealer and the associated seaming roll. A can can preferably include a metal, especially aluminum or steel.

In general, the sealer can preferably include at least two types of seaming rolls with preferably different seaming profiles (wherein the respective seaming head includes seaming rolls of both types), so that cans can be sealed according to a double seaming principle, in which the cans are generally sealed in two steps. Each one type of seaming roll is therein responsible for one step. The first type of seaming roll generates a pre-seam, while the second type of seaming roll completely seals the can/the package.

In the method according to the disclosure, can lids and can bodies can be guided together at a defined point before the actual seaming process. The supplying of the can lids preferably occurs by the supplying device, upon which the can lids rest. Alternatively, the supplying device can be the lid rotor with the stationary tracks, wherein the lids rest on the tracks and are moved towards the container by the lid rotor.

The can bodies are supplied by the container supply according to the disclosure. The can bodies get from the container supply to one of the respective lifting stations (which are integrated into the carousel). At one turn of the carousel shaped stations the lifting stations preferably perform a cam-controlled lifting motion, to drive the can bodies to the can lids from below and later the seaming head.

After a specified lifting stretch the can body comes into contact with the can lid.

Preferably the can sealer still includes an ejection element. The ejection element is, for example, attached to an ejection rod, which performs a linear movement along the axial direction within the seaming shaft of the seaming head. Preferably cam-controlled, the can lid is first clamped in a lid guide during the downward movement. As soon as the can body is driven in the can lid, the ejection element changes the direction of the lift and steadily drives upward with the lifting station. The supporting function of the ejection element ends with the driving into the seaming head of the can body and the can lid. From this moment, the can is clamped between the lifting station and the seaming head. Afterward the actual seaming process is executed.

Generally, the sealer according to the disclosure can be analogous to the can sealers already known from the state of the art, but differs in the container supply system, thus avoiding the disadvantages of the state of the art.

BRIEF DESCRIPTION OF THE DRAWINGS

Embodiments of the invention will be explained in more detail with reference to the drawings.

DETAILED DESCRIPTION

Figure 1:
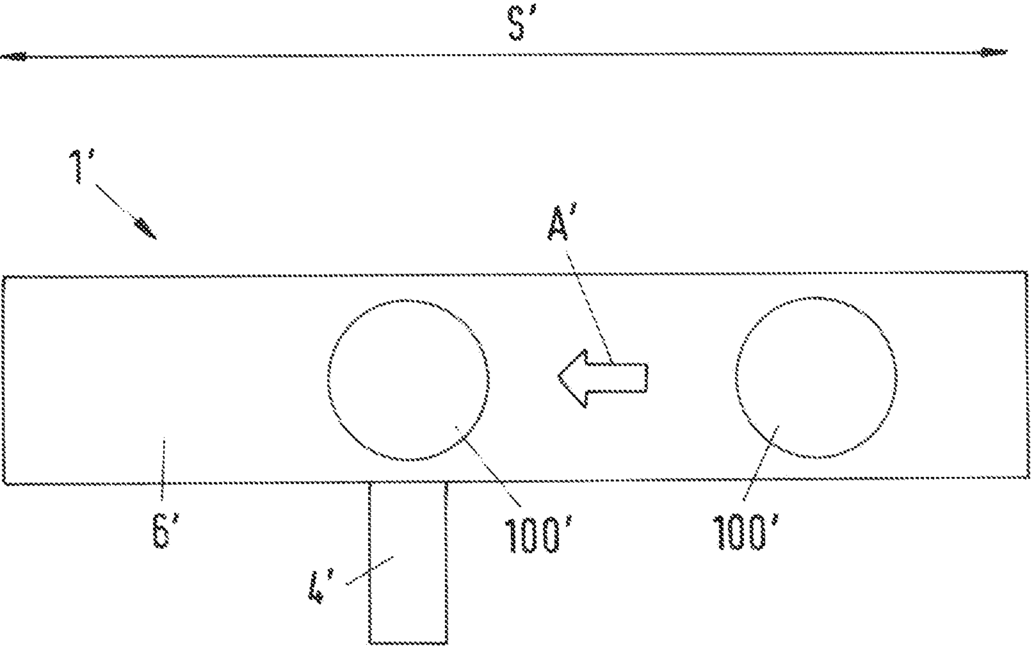
FIG. 1 illustrates a plan view of a container supply system from the state of the art.

FIG. 1 has already previously been described during the description of the state of the art.

Figure 2:
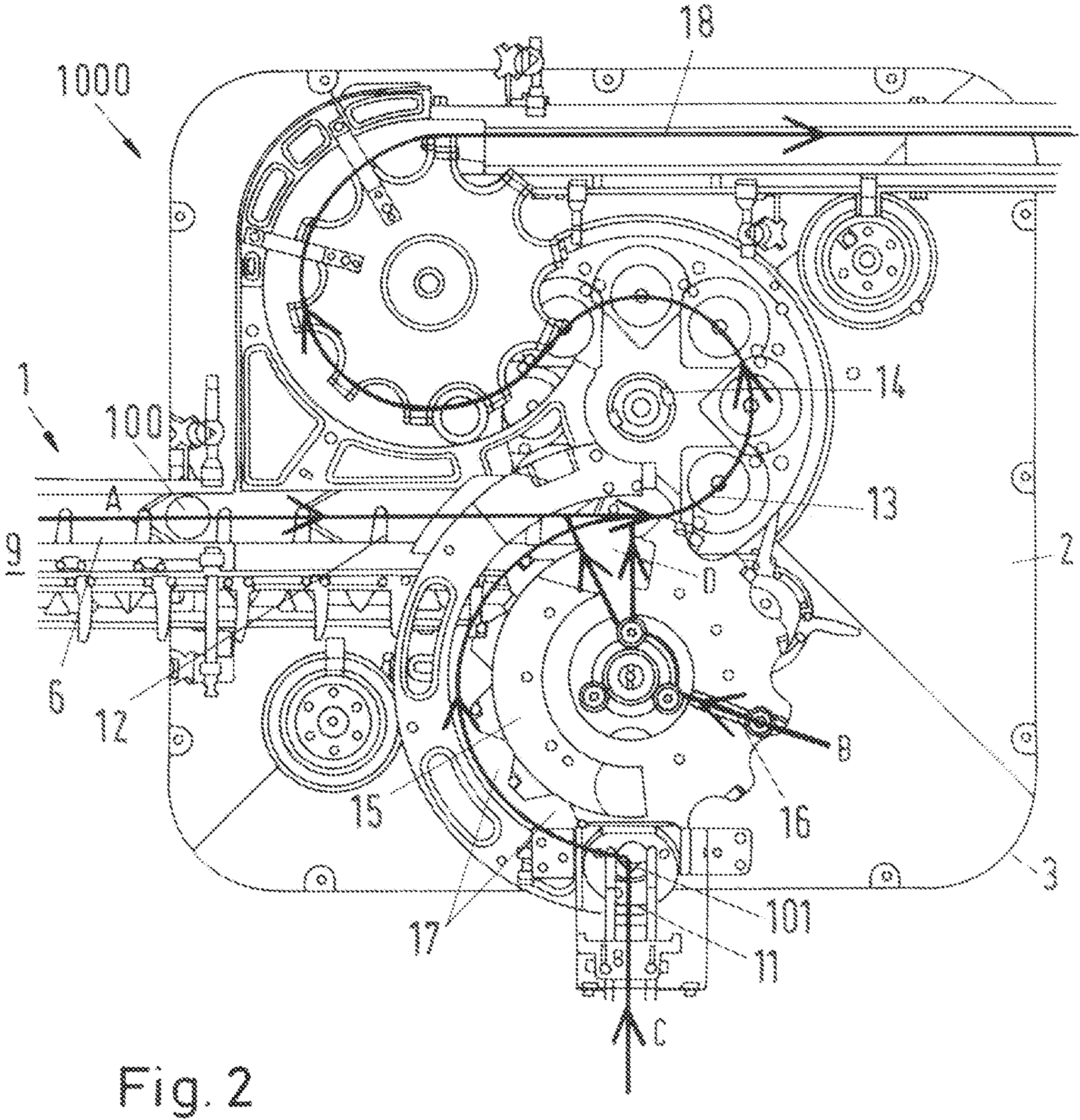
FIG. 2 illustrates a plan view of a can sealer according to the disclosure.

FIG. 2 shows a plan view of a can sealer 1000 according to the disclosure. In general, the sealing process occurs analogously to the state of the art.

The can sealer 1000 according to FIG. 2 includes a lid providing device 11 for providing a lid 101, a gassing rotor 15 for supplying gas to the can 100 and for guiding and transporting the lid 101 to the can 100. Additionally, the sealer includes a seaming process/carousel with seaming stations 14 for sealing the can 100 with the lid 101. Therein the seaming process 14 is arranged in a working area 2 of the can sealer 1000 enclosed by a casing 3.

The lid 101 is brought into the working space 2 of the can sealer 1000 by the lid providing device 11 along the arrow C. Herein the lids 101 are deposited on the gassing rotor 15. The lids 101 are transported further by rotation of the gassing rotor 15.

The cans 100 are guided from a container dispenser 9 in direction of arrow A to the working space 2 by the carriers 12, arranged on a chain, of the container supply system 1 according to the disclosure. There, the cans 100 are brought into the container receivers 17 of the gassing rotor 15. There, in area D, the can is gassed with a gas such as carbon dioxide or nitrogen and united with the lid 101. The providing of a lid 101 by the lid providing device 11 is made possible by the sensor (not depicted here), which detects the can 1000 entering the working space 2.

The gassing occurs along the arrow B with the gas supply 16 via the gassing rotor 15. After gassing, the can 100 with the lid 101 is guided further by the container transfer 13 from the gassing rotor 15 to the seaming process 14 and sealed there. Alternatively to the gassing rotor 15, a lid rotor with tracks can also be used for the transport of the lids, wherein the gassing is executed via a linear gassing device, which is arranged stationary. The lids then merely rest on the tracks and are moved by the lid rotor.

The cans 100 with lids 101 are clamped and sealed by the seaming process 14. The sealed can is forwarded to the can exit 18 by a further rotor.

During the gassing, the gas is conveyed to an underside of the lid 101. In this way, it can be guaranteed that a remaining volume of the can 100, within which no foodstuff is arranged, is for the most part filled with gas before sealing, wherein the air which was originally present in the remaining volume is displaced as completely as possible by the gas. Hereby a longer shelf life can possibly be achieved for the foodstuff arranged in the can 100.

Figure 4:
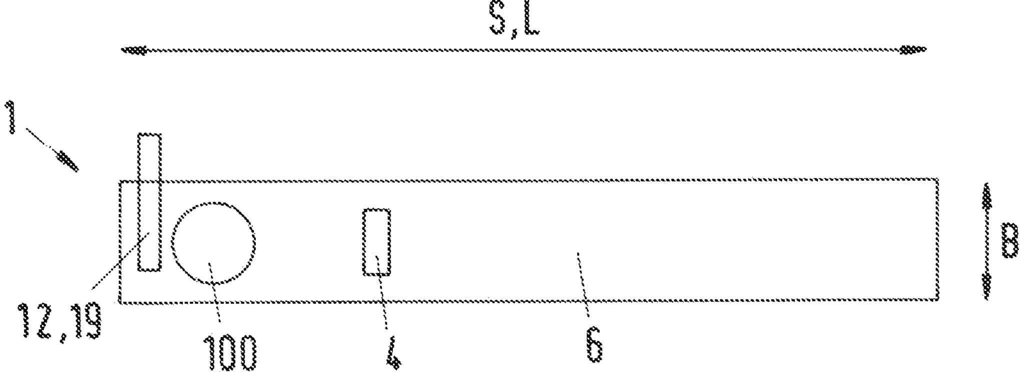
FIG. 4 illustrates a plan view of an additional embodiment of a container supply system according to the disclosure.

FIG. 4 depicts a plan view of an additional embodiment of a container supply system 1 according to the disclosure. According to the disclosure, the container supply system 1 for the transport of a container 100 along a transport route S from a container source to a container receiver includes a movement device 19 with carrier 12 for the reception and the transport of the container 100 along the transport route S and a transport belt 6 stretching along the transport route S with its length, upon which transport belt 6 the container 100 is moveable along the transport route S by the movement device 19. For the detection of the container 100 the container supply system 1 also includes a sensor 4 arranged at the transport belt.

Herein the sensor 4 stretches across a width B of the transport belt 6, running perpendicular to the length L of the transport belt 6 (meaning not across the entire width B, but rather only partially/segmentally across the width B of the transport belt 6) in such a way that the container 100 moving along the transport route S can be detected.

Figure 3A:
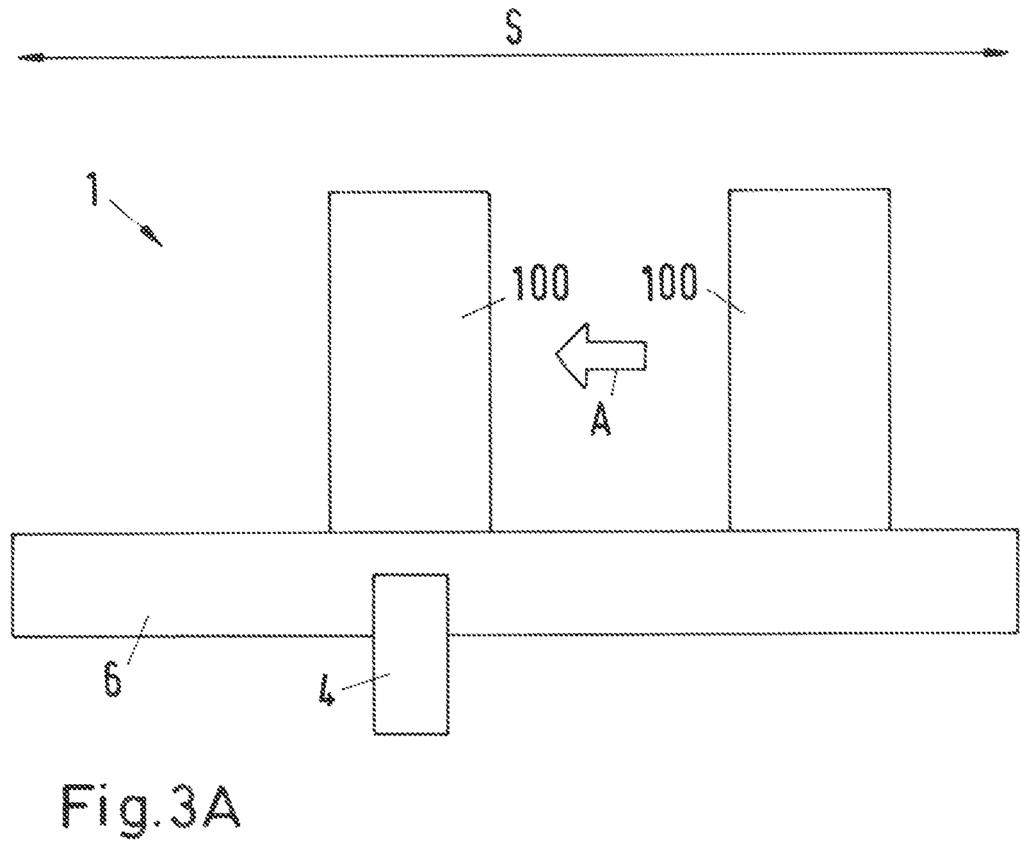
FIG. 3A illustrates a side view of a first embodiment of a container supply system according to the disclosure.

FIG. 3A shows a side view of a first embodiment of a of a container supply system 1 according to the disclosure, in which the containers 100 are moved in a gliding manner across the transport belt 6, designed as a gliding belt 6, along the transport route S in direction A.

Instead of a detection system on the side, a detection system with a sensor 4 is used, which is located beneath the gliding belt 6, meaning arranged beneath the gliding belt. In order to reduce the distance to the can 100 and to ensure a detection, the gliding belt 6 is modified in such a way that the sensor 4 is close to the can 100, by being arranged within a recess in the gliding belt 6.

Additionally, the sensor 4 is designed as an inductive sensor 4.

The sensor 4 (specifically its positioning) does no longer need to be adjusted during a change in the diameter of the container. Additionally, the sensor 4 is less vulnerable to contamination or cleaning media since it is partially integrated into the gliding belt 6 and is located beneath the gliding belt 6. Additionally, no attachment on the side must be provided any more.

Figure 3B:
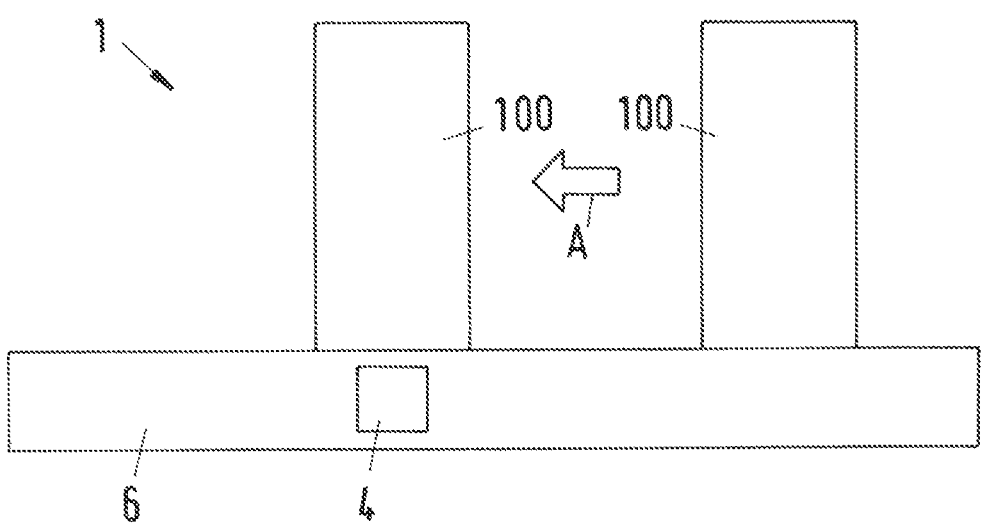
FIG. 3B illustrates a side view of a second embodiment of a container supply system according to the disclosure.

FIG. 3B shows a side view of a second embodiment of a container supply system 1 according to the disclosure. Generally, the system is designed analogously to the system according to FIG. 3A, however the sensor 4 is located in the gliding belt 6.

Figure 3C:
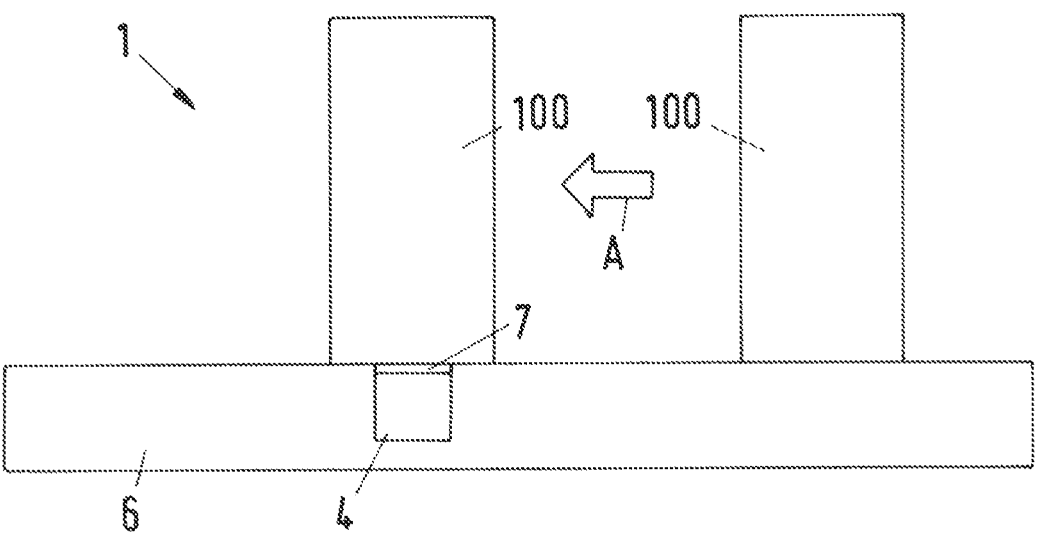
FIG. 3C illustrates a side view of a third embodiment of a container supply system according to the disclosure.

FIG. 3C shows a side view of a third embodiment of a container supply system 1 according to the disclosure. Therein the sensor 4 is arranged in the gliding belt 6, in opposition to the embodiment according to FIG. 3A, and it is designed as an optical sensor 4.

An optically transparent window 7 is provided above the sensor 4, through which the sensor 4 can detect the containers moving over the sensor 4.

Alternatively, the sensor 4 can also be provided without a window 7. However, the sensor 4 can then be more easily be damaged by containers 100 moving over the sensor 4.

Figure 3D:
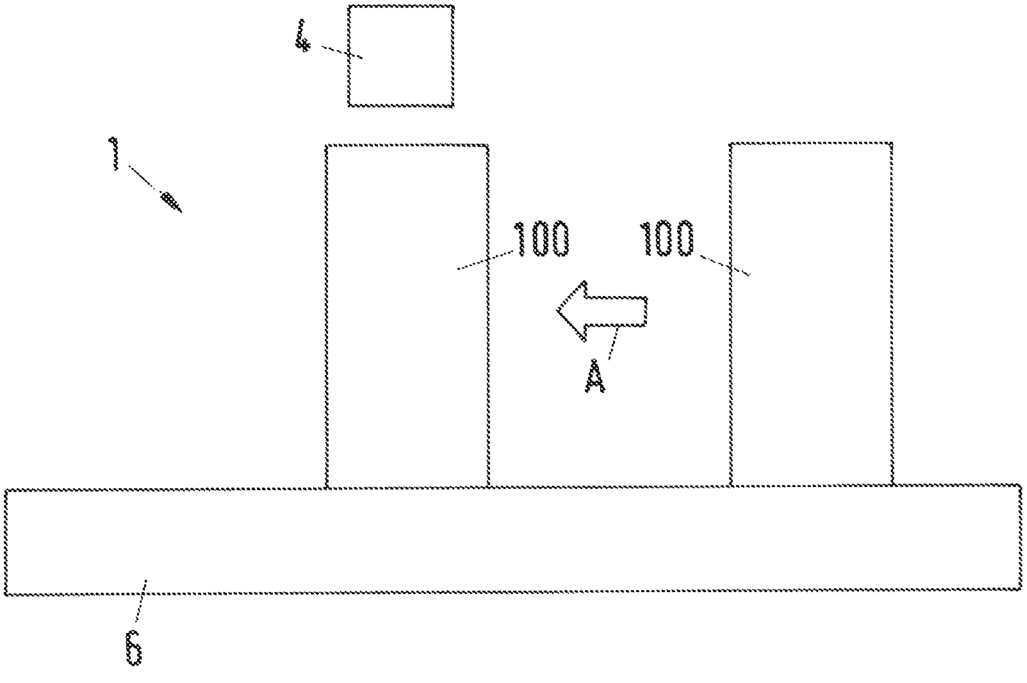
FIG. 3D illustrates a side view of a fourth embodiment of a container supply system according to the disclosure.

FIG. 3D shows a side view of a fourth embodiment of a container supply system 1 according to the disclosure. In opposition to the embodiments according to FIG. 3A-C, the sensor 4 however is arranged above the transport belt 6, so that the containers 100 move between the transport belt 6 and the sensor 4 and are not moved over the sensor 4.

In this embodiment the transport belt 6 can be designed as a conveyor belt 6.

The container supply system 1 preferably transports the containers 100 from a container source in form of a filler to a container receiver in form of a sealer.

As the sensor 4 is not arranged on the side next to the transport belt 6, but rather stretches along the width of the transport belt 6, the sensor 4 does not need to change its position during a change in format to another container diameter, as a distance to the container 100 moving past is the same for every container diameter.

Preferably, the sensor 4 is arranged centrally in relation to the width B of the transport belt 6, meaning in the center of the transport belt 6.

The sensor 4 is also part of the non-depicted detection system, so that a signal which is triggered by the container 100 moving past the sensor 4 can be translated into a control signal which controls the lid supply in form of the lid providing device 11 and enables a providing of the lid 101.

The disclosure is not limited to the revealed embodiments. Other variations of the revealed embodiments can be understood and effected by experts while putting into practice a claimed disclosure from a study of the drawings, the revelation, and the dependent claims. In the claims the word "including" in no way excludes any other elements or steps and the indefinite article "a" or "an" does not exclude a multitude. The mere fact that specific measures are repeated in dependent claims which differ from one another, does not mean that a combination of these measures cannot be utilized advantageously. Any reference signs in the claims should not be interpreted as limitation of the scope.

The invention claimed is:

1. A container supply system for the transport of a container along a transport route from a container source to a container receiver, comprising:

a movement device configured to receive and transport the container along the transport route, the movement device comprising carriers and a drive coupled to a pulling element such that the pulling element is moveable by the drive, the carriers being configured to move the container by the pulling element that pulls the carrier along the transport route;

a transport belt stretching along the transport route with a length, the container moveable upon the transport belt along the transport route by the movement device; and a sensor arranged below the transport belt to detect the container, the sensor stretching along a width of the transport belt running perpendicular to the length of the transport belt such that the container moving along the transport route is detectable by the sensor, the transport belt being a gliding belt, so that the container is moveable in a gliding manner over a gliding surface of the gliding belt along the transport route and over the sensor.

2. The container supply system according to claim 1, wherein the sensor is an inductive sensor.

3. The container supply system according to claim 1, further including a drive coupled to the pulling element such that the pulling element is moveable by the drive.

4. The container supply system according to claim 1, wherein the movement device includes a plurality of carriers, and the plurality of carriers are connected to the pulling element.

5. The container supply system according to claim 1, wherein the pulling element is a chain, a belt, a rope, or a strap.

6. A method for the transport of the container, comprising:

providing a container supply system according to claim 1, and transporting the container by the container supply system along the transport route.

7. The method according to claim 6, wherein the transporting the container includes receiving the container by the movement device in a reception area of the container source, transporting the container by the movement device along the transport route, and detecting the container moving along the transport route by the sensor.

8. The container supply system according to claim 1, wherein the movement device includes a plurality of carriers, and the plurality of carriers are attached directly to the pulling element.

9. A processing device for processing a container, comprising:

a container source;

a container receiver; and the container supply system according to claim 1, the container supply system arranged between the container source and the container receiver to transport the container from the container source to the container receiver.

10. The processing device according to claim 9, wherein the container source is a container dispenser configured to provide empty containers or the container receiver is a filling station configured to fill the container with a filling material.

11. The processing device according to claim 9, wherein the container source is a filling station configured to fill the container with a filling material or the container receiver is a sealer configured to seal sealing the container with a lid.

12. A sealer comprising:

a container supply system according to claim 1 to supply the container to a working space of the sealer.

13. A method for sealing a container, comprising providing a sealer; and supplying the container to a working space by the container supply system according to claim 1;

detecting the container; and sealing the container with a lid in the working space.

* * * * *